(12) United States Patent
Kim

(10) Patent No.: US 11,961,505 B2
(45) Date of Patent: Apr. 16, 2024

(54) ELECTRONIC DEVICE AND METHOD FOR IDENTIFYING LANGUAGE LEVEL OF TARGET

(71) Applicant: Samsung Electronics Co., Ltd., Gyeonggi-do (KR)

(72) Inventor: Taegu Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 17/573,026

(22) Filed: Jan. 11, 2022

(65) Prior Publication Data

US 2022/0139370 A1 May 5, 2022

Related U.S. Application Data

(63) Continuation of application No. PCT/KR2020/007782, filed on Jun. 16, 2020.

(30) Foreign Application Priority Data

Jul. 31, 2019 (KR) .................... 10-2019-0092958

(51) Int. Cl.
| | | |
|---|---|---|
| *G10L 15/00* | (2013.01) | |
| *G10L 15/02* | (2006.01) | |
| *G10L 15/22* | (2006.01) | |
| *G10L 15/24* | (2013.01) | |

(52) U.S. Cl.
CPC ............ *G10L 15/005* (2013.01); *G10L 15/02* (2013.01); *G10L 15/22* (2013.01); *G10L 15/24* (2013.01); *G10L 2015/225* (2013.01)

(58) Field of Classification Search
CPC ....... G10L 15/005; G10L 15/02; G10L 15/22; G10L 15/24; G10L 2015/225; G10L 15/32; G10L 25/66; G10L 2015/227; G10L 25/51; G10L 15/26; G06F 40/253
USPC ........................................................... 704/8
See application file for complete search history.

(56) References Cited

U.S. PATENT DOCUMENTS

| | | | |
|---|---|---|---|
| 5,387,104 A | | 2/1995 | Corder |
| 5,675,817 A | * | 10/1997 | Moughanni ............ G08B 5/229 704/3 |
| 6,349,275 B1 | * | 2/2002 | Schumacher ....... G06F 16/9577 704/8 |
| 8,965,764 B2 | | 2/2015 | Ryu et al. |
| 10,062,376 B2 | | 8/2018 | Ryu et al. |
| 10,878,813 B2 | | 12/2020 | Ray et al. |

(Continued)

FOREIGN PATENT DOCUMENTS

| | | |
|---|---|---|
| KR | 10-2019-0006348 | 1/2019 |
| KR | 10-2019-0031829 | 3/2019 |
| KR | 10-2019-0075870 | 7/2019 |

*Primary Examiner* — Thuykhanh Le
(74) *Attorney, Agent, or Firm* — The Farrell Law Firm, P.C.

(57) ABSTRACT

Methods and devices for identifying language level are provided. A first automatic speech recognition (ASR) module is identified, from among a plurality of ASR modules, based on information on a target received at the electronic device. First voice data and first image data for the target are received. The first voice data and the first image data are converted to first text data using the first ASR module. A first language level of the target is identified based on the first text data. Data including at least one of a voice output and an image output is output based on the first language level satisfying a condition.

20 Claims, 10 Drawing Sheets

(56) References Cited

U.S. PATENT DOCUMENTS

| | | | |
|---|---|---|---|
| 11,670,281 B2* | 6/2023 | Sharifi | G06F 40/253 |
| | | | 704/260 |
| 2006/0080084 A1* | 4/2006 | Shuster | G06Q 10/00 |
| | | | 707/E17.058 |
| 2006/0129385 A1* | 6/2006 | Heller | A61K 31/195 |
| | | | 704/200 |
| 2008/0133233 A1* | 6/2008 | Tsubura | G16H 40/63 |
| | | | 704/235 |
| 2009/0083288 A1* | 3/2009 | LeDain | G09B 19/06 |
| 2009/0204406 A1* | 8/2009 | Keim | G10L 17/26 |
| | | | 704/270 |
| 2010/0010802 A1* | 1/2010 | Ruano | G06Q 10/06 |
| | | | 704/9 |
| 2011/0224978 A1 | 9/2011 | Sawada | |
| 2012/0053929 A1* | 3/2012 | Hsia | G16H 50/30 |
| | | | 704/9 |
| 2014/0297266 A1* | 10/2014 | Nielson | A61B 5/165 |
| | | | 704/9 |
| 2014/0379327 A1* | 12/2014 | Kamada | G06F 40/47 |
| | | | 704/9 |
| 2015/0088486 A1* | 3/2015 | Barrett | G06F 16/3322 |
| | | | 704/3 |
| 2017/0084198 A1* | 3/2017 | Thitithamasak | G09B 19/06 |
| 2017/0221472 A1* | 8/2017 | Sharifi | G10L 13/08 |
| 2017/0287355 A1* | 10/2017 | Pogorelik | G09B 19/04 |
| 2018/0268728 A1* | 9/2018 | Burdis | G09B 7/04 |
| 2018/0341330 A1* | 11/2018 | Parker | G06F 3/0482 |
| 2019/0073997 A1* | 3/2019 | Millen | G10L 15/16 |
| 2019/0099473 A1 | 4/2019 | Fujita et al. | |
| 2019/0115010 A1* | 4/2019 | Yu | G10L 13/04 |
| 2019/0122578 A1* | 4/2019 | Wasserman | G09B 19/06 |
| 2019/0205373 A1* | 7/2019 | Walsh | G06F 40/263 |
| 2019/0333508 A1* | 10/2019 | Rao | G10L 15/25 |
| 2019/0385594 A1 | 12/2019 | Park et al. | |
| 2020/0004768 A1* | 1/2020 | Bujnowski | G10L 15/22 |
| 2020/0098357 A1* | 3/2020 | Trim | G10L 15/22 |
| 2020/0111484 A1* | 4/2020 | Aleksic | G10L 15/22 |
| 2020/0134013 A1* | 4/2020 | Pasternack | G06F 40/197 |
| 2020/0196022 A1* | 6/2020 | Sen | G06F 40/247 |
| 2020/0250781 A1* | 8/2020 | Choi | G06Q 30/04 |
| 2020/0293585 A1* | 9/2020 | Pasternack | G06F 40/232 |
| 2020/0349937 A1* | 11/2020 | Li | G06F 3/167 |
| 2021/0019369 A1* | 1/2021 | Sharma | G06F 40/263 |
| 2021/0065568 A1* | 3/2021 | O | G06F 16/955 |
| 2021/0343172 A1* | 11/2021 | Watanabe | G09B 5/02 |
| 2021/0383793 A1* | 12/2021 | Saito | G10L 15/005 |
| 2021/0397991 A1* | 12/2021 | Gatson | G06N 20/00 |
| 2022/0013117 A1* | 1/2022 | Kawano | G06F 3/0346 |
| 2022/0046310 A1* | 2/2022 | Shin | H04N 21/42203 |
| 2022/0148248 A1* | 5/2022 | McIntyre-Kirwin | G06V 20/20 |
| 2022/0266161 A1* | 8/2022 | Kawauchi | A63H 11/00 |

* cited by examiner

ELECTRONIC DEVICE AND METHOD FOR IDENTIFYING LANGUAGE LEVEL OF TARGET

CROSS-REFERENCE TO RELATED APPLICATIONS

This application is a bypass continuation application, claiming priority under § 365(c) to International Application No. PCT/KR2020/007782, filed on Jun. 16, 2020, which is based on and claims priority to Korean Patent Application Serial No. 10-2019-0092958, filed on Jul. 31, 2019 in the Korean Intellectual Property Office, the disclosures of each of which is incorporated herein by reference in its entirety.

BACKGROUND

1. Field

The disclosure relates generally to speech recognition of an electronic device, and more particularly, to an electronic device and method for identifying a language level of a target.

2. Description of Related Art

In addition to conventional input methods that use a keyboard or a mouse, more recently developed electronic devices support voice input as an input method. For example, electronic devices such as smart phones or tablet personal computers (PCs) may receive a user utterance and then may provide a service for performing an action corresponding to the received user utterance.

Speech recognition services are being developed based on technology for processing a natural language. The technology for processing a natural language grasps the intent of a user input (e.g., the utterance) and generates the result matched with the intent to provide the user with the service.

Speech recognition services also analyze a voice input of a target that is a user to identify a language level of the target.

When a language level of a target is identified using a speech recognition service, it may be limited by using only the target's voice input. However, the language level is a basis for determining language acquisition ability, and whether language a disability is present may be determined based on various causes, such as, for example, the target's behavior or the target's eyesight, and not simply whether the target speaks well. Furthermore, because the result of the voice input is generally generated by using an automatic speech recognition (ASR) module that is implemented based on adults, there may be limitations in understanding a language level in consideration of the age of the target.

SUMMARY

An electronic device and method are provided that may identify the target's language level by using image data associated with the target as well as voice data about the target's voice input.

An electronic device and method are provided that may identify the language level of the target in consideration of the age of the target, by selectively applying an ASR module suitable for the age of the target and by generating a result of a voice input.

According to an aspect, an electronic device is provided that includes a processor and a memory operatively connected to the processor. The memory stores instructions that, when executed, cause the processor to identify a first ASR module, from among a plurality of ASR modules, based on information on a target received at the electronic device. The instructions also cause the processor to receive first voice data and first image data for the target, and convert the first voice data and the first image data to first text data using the first ASR module. The instructions further cause the processor to identify a first language level of the target based on the first text data, and output data including at least one of a voice output and an image output based on the first language level satisfying a condition.

According to an aspect, a method of an electronic device for identifying language level includes identifying a first ASR module, from among a plurality of ASR modules, based on information on a target received at the electronic device. First voice data and first image data for the target are received. The first voice data and the first image data are converted to first text data using the first ASR module. A first language level of the target is identified based on the first text data. Data including at least one of a voice output and an image output is output based on the first language level satisfying a condition.

According to an aspect, an electronic device registered in an account of a target may include a processor and a memory operatively connected to the processor. The memory may store instructions that, when executed, cause the processor to identify a first language level of the target based on first voice data of the target received at the electronic device. The instructions may also cause the processor to identify a second language level of the target by receiving second voice data and second image data from the electronic device and at least one external electronic device registered in the account, based on the first language level being lower than a reference level. The instructions may further cause the processor to output data including at least one of voice output and image output based on the second language level satisfying a condition, and to identify a third language level of the target based on input data received in response to the data.

Language level identification may be obtained with high accuracy by identifying a target's language level in consideration of the target's age and the target's behavior.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
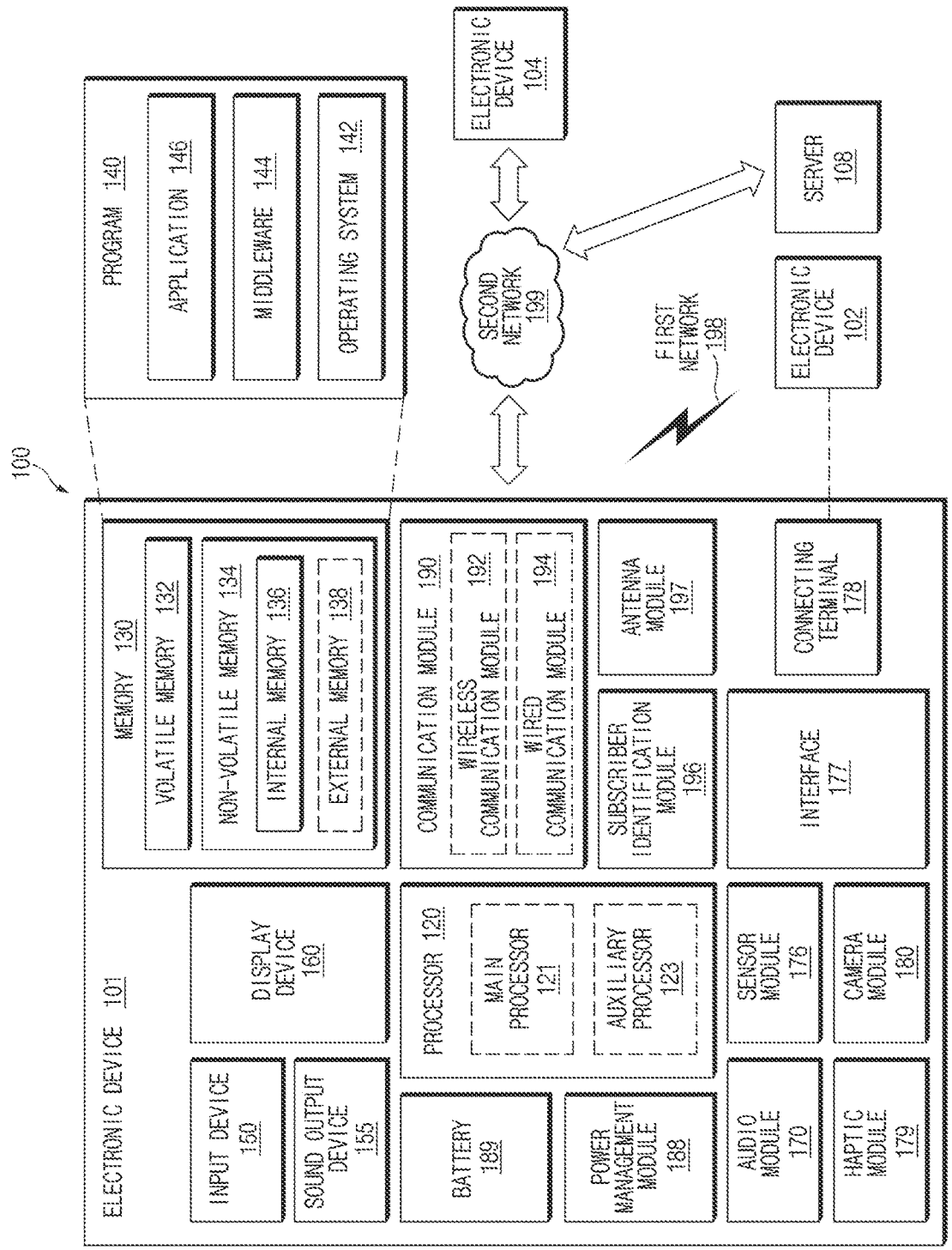
FIG. 1 illustrates an electronic device in a network environment, according to an embodiment.

Embodiments are described in detail with reference to accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used herein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 illustrates an electronic device in a network environment, according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
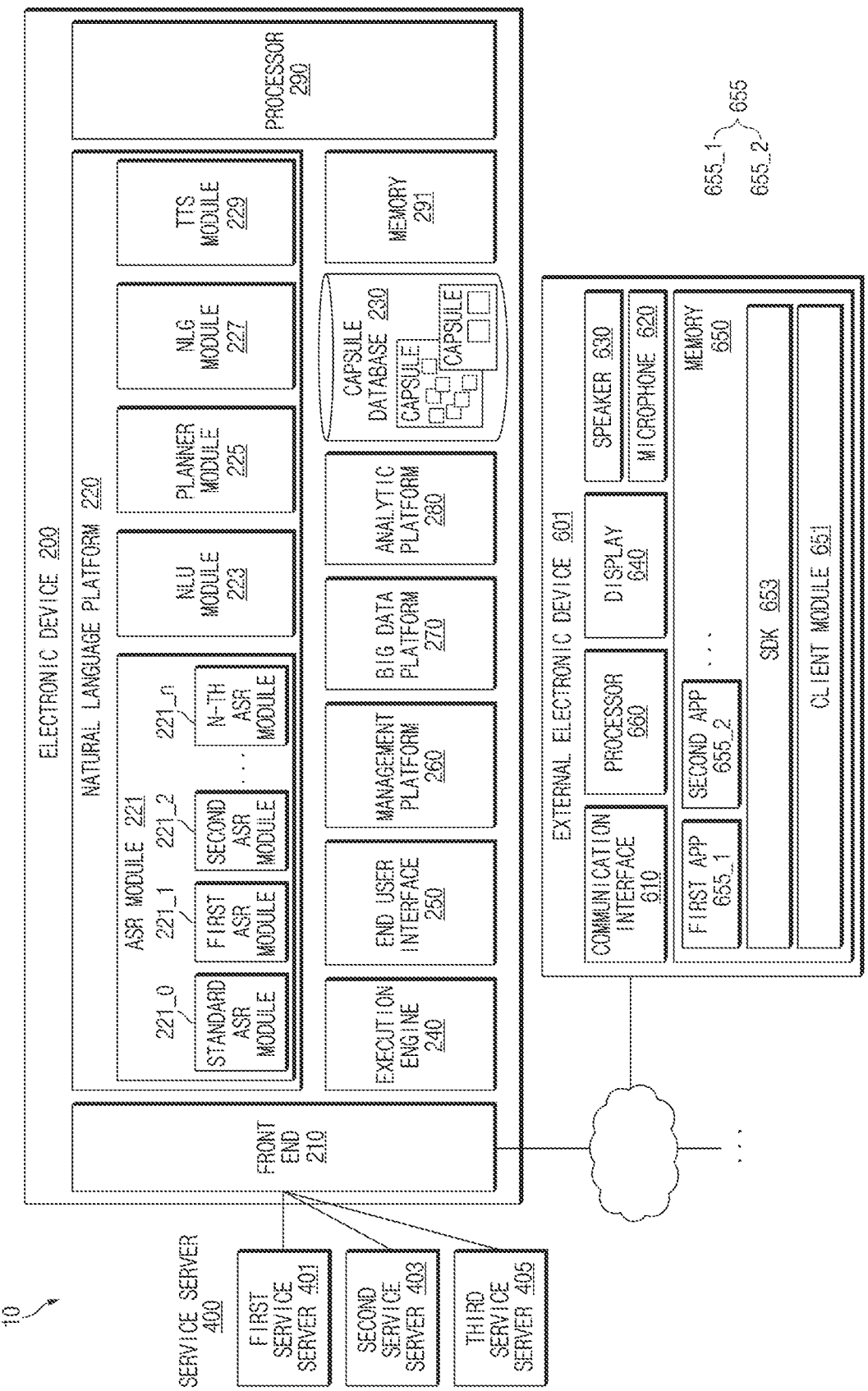
FIG. 2A illustrates an integrated intelligence system, according to an embodiment.

FIG. 2A illustrates an integrated intelligence system, according to an embodiment.

Referring to FIG. 2A, an integrated intelligence system 10 includes an electronic device 200 and an external electronic device 601.

The external electronic device 601 may be a terminal device (or an electronic device) capable of connecting to Internet, and may be, for example, a mobile phone, a smartphone, a personal digital assistant (PDA), a notebook computer, TV, a household appliance, a wearable device, a head mounted device (HMD), or a smart speaker. A single external electronic device 601 is illustrated in the drawing, but embodiments are not limited thereto. For example, a plurality of external electronic devices 601 capable of communicating with the electronic device 200 may be included in the integrated intelligence system 10.

The external electronic device 601 includes a communication interface 610, a microphone 620, a speaker 630, a display 640, a memory 650, and a processor 660. The listed components may be operatively or electrically connected to one another.

The communication interface 610 may be connected to an external device and may be configured to transmit or receive data to or from the external device. The microphone 620 may receive a sound (e.g., a user utterance) to convert the sound into an electrical signal. The speaker 630 may output the electrical signal as a sound (e.g., voice). The display 640 may be configured to display an image or a video. The display 640 may display a graphic user interface (GUI) of the running app (or an application program).

The memory 650 stores a client module 651, a software development kit (SDK) 653, and a plurality of apps 655 (e.g., a first app 655_1 and a second app 655_2). The client module 651 and the SDK 653 may constitute a framework (or a solution program) for performing general-purposed functions. Furthermore, the client module 651 or the SDK 653 may constitute the framework for processing a voice input.

The plurality of apps (e.g., the first app 655_1 and the second app 655_2) may be programs for performing a specified function. Each of the plurality of apps 655 may include a plurality of actions for performing a specified function. For example, the apps may include an alarm app, a message app, and/or a schedule app. The plurality of apps 655 may be executed by the processor 660 to sequentially execute at least part of the plurality of actions.

The processor 660 may control an overall operation of the external electronic device 601. For example, the processor 660 may be operatively connected to the communication interface 610, the microphone 620, the speaker 630, and the display 640 so as to perform a specified operation. For example, the processor 660 may include one or more processors. For example, the one or more processors may include an ISP, an AP, or a CP.

Moreover, the processor 660 according to an embodiment may execute the program stored in the memory 650 to perform a specified function. For example, according to an embodiment, the processor 660 may execute at least one of the client module 651 or the SDK 653 so as to perform a following operation for processing a voice input. The processor 660 may control operations of the plurality of apps 655 via the SDK 653. The following operation described as an operation of the client module 651 or the SDK 653 may be executed by the processor 660.

The client module 651 may receive a voice input. For example, the client module 651 may receive a voice input corresponding to a user utterance detected through the microphone 620. The client module 651 may transmit the received voice input to the electronic device 200. The client module 651 may transmit state information of the external electronic device 601 to the electronic device 200 together with the received voice input. For example, the state information may be execution state information of an app.

The client module 651 may receive a result corresponding to the received voice input. For example, when the electronic device 200 is capable of calculating the result corresponding to the received voice input, the client module 651 may receive the result corresponding to the received voice input. The client module 651 may display the received result on the display 640.

The client module 651 may receive a plan corresponding to the received voice input. The client module 651 may display, on the display 640, a result of executing a plurality of actions of an app depending on the plan. For example, the client module 651 may sequentially display the result of executing a plurality of actions on a display. In another example, the external electronic device 601 may display only a part of results (e.g., a result of the last action) of executing the plurality of actions, on the display.

The client module 651 may receive a request for obtaining information necessary to calculate the result corresponding to a voice input, from the electronic device 200. The client module 651 may transmit the necessary information to the electronic device 200 in response to the request.

The client module 651 may transmit, to the electronic device 200, information about the result of executing a plurality of actions depending on the plan. The electronic device 200 may identify that the received voice input is correctly processed, using the result information.

The client module 651 may include a speech recognition module. The client module 651 may recognize a voice input for performing a limited function, via the speech recognition module. For example, the client module 651 may launch an intelligence app that processes a voice input for performing an organic action, via a specified input (e.g., wake up!).

The electronic device 200 may receive information associated with a user's voice input from the external electronic device 601 over a communication network. The electronic device 200 may convert data associated with the received voice input to text data. The electronic device 200 may generate a plan for performing a task corresponding to the user's voice input, based on the text data.

The plan may be generated by an artificial intelligence (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. The plan may be selected from a set of predefined plans or may be generated in real time in response to a user request. For example, the AI system may select at least one plan of the plurality of predefined plans.

The electronic device 200 may transmit a result according to the generated plan to the external electronic device 601 or may transmit the generated plan to the external electronic device 601. The external electronic device 601 may display the result according to the plan, on a display. The external electronic device 601 may display a result of executing the action according to the plan, on the display.

The electronic device 200 includes a front end 210, a natural language platform 220, a capsule DB 230, an execution engine 240, an end user interface 250, a management platform 260, a big data platform 270, an analytic platform 280, a processor 290, and a memory 291.

The front end 210 may receive a voice input received from the external electronic device 601. The front end 210 may transmit a response corresponding to the voice input.

The natural language platform 220 includes an ASR module 221, a natural language understanding (NLU) module 223, a planner module 225, a natural language generator (NLG) module 227, and a text to speech (TTS) module 229.

The ASR module 221 may convert the voice input received from the external electronic device 601 into text data.

The ASR module 221 includes a plurality of modules. For example, the ASR module 221 includes a standard ASR module 221_0, a first ASR module 221_1, a second ASR module 221_2, . . . and an n-th ASR module 221_n (where 'n' is a natural number). For example, the standard ASR module 221_0 and the 'n' ASR modules (221_1, 221_2, . . . , 221_n) may be modules classified for each age group. When the external electronic device 601 receives voice data from a target having the age of 19 or higher, the voice data transmitted to the electronic device 200 may be converted into text data by using the standard ASR module 221_0. When the external electronic device 601 receives voice data from a target under the age of 3, the voice data transmitted to the electronic device 200 may be converted into text data by using the first ASR module 221_1. The plurality of ASR modules (221_0, 221_1, 221_2, . . . , 221_n) may convert voice data into text data based on different pieces of information corresponding to age groups.

The NLU module 223 may grasp the intent of the user, using the text data of the voice input. For example, the NLU module 223 may grasp the intent of the user by performing syntactic analysis or semantic analysis. The NLU module 223 may grasp the meaning of words extracted from the voice input by using linguistic features (e.g., syntactic elements) such as morphemes or phrases and may determine the intent of the user by matching the grasped meaning of the words to the intent.

The planner module 225 may generate the plan by using a parameter and the intent that is determined by the NLU module 223. The planner module 225 may determine a plurality of domains necessary to perform a task, based on the determined intent. The planner module 225 may determine a plurality of actions included in each of the plurality of domains determined based on the intent. The planner module 225 may determine the parameter necessary to perform the determined plurality of actions or a result value output by the execution of the plurality of actions. The parameter and the result value may be defined as a concept of a specified form (or class). As such, the plan may include the plurality of actions and a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan by using information stored in the capsule DB 230 storing a set of relationships between concepts and actions.

The NLG module 227 may change specified information into information in a text form. The information changed to the text form may be in the form of a natural language speech. The TTS module 229 may change information in the text form to information in a voice form.

All or part of the functions of the natural language platform 220 may be also implemented in the external electronic device 601.

The capsule DB 230 may store information about the relationship between the actions and the plurality of concepts corresponding to a plurality of domains. The capsule DB 230 may include a plurality of action objects (or action information) and concept objects (or concept information) included in the plan. The capsule DB 230 may store the plurality of capsules in a form of a concept action network (CAN). The plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. The capsule DB 230 may include a follow-up registry that stores information of the follow-up action for suggesting a follow-up action to the user in a specified context. For example, the follow-up action may include a follow-up utterance. The capsule DB 230 may include a layout registry for storing layout information of the information output via the speech recognition device 601. The capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set.

The capsule DB 230 may be also implemented in the external electronic device 601.

The execution engine 240 may calculate a result by using the generated plan. The end user interface 250 may transmit the calculated result to the external electronic device 601. Accordingly, the external electronic device 601 may receive the result and may provide the user with the received result. The management platform 260 may manage information used by the electronic device 200. The big data platform 270 may collect data of the user. The analytic platform 280 may manage quality of service (QoS) of the electronic device 200. For example, the analytic platform 280 may manage the component and processing speed (or efficiency) of the electronic device 200.

A service server 400 may provide the external electronic device 601 with a specified service (e.g., ordering food or booking a hotel). The service server 400 may be a server operated by the third party. The service server 400 may provide the electronic device 200 with information for generating a plan corresponding to the received voice input. The provided information may be stored in the capsule DB 230. Furthermore, the service server 400 may provide the electronic device 200 with result information according to the plan. The service server may include a first service server 401, a second service server 403, and a third service server 405.

In the integrated intelligence system 10, the external electronic device 601 may provide the user with various intelligent services in response to a user input. The user input may include, for example, an input through a physical button, a touch input, or a voice input.

The external electronic device 601 may provide a speech recognition service via an intelligence app (or a speech recognition app) stored therein. In this case, for example, the external electronic device 601 may recognize a user utterance or a voice input, which is received via the microphone 620, and may provide the user with a service corresponding to the recognized voice input.

The external electronic device 601 may perform a specified action, based on the received voice input, independently, or together with the electronic device 200 and/or the service server 400. For example, the external electronic device 601 may launch an app corresponding to the received voice input and may perform the specified action via the executed app.

When providing a service together with the electronic device 200 and/or the service server 400, the external electronic device 601 may detect a user utterance by using the microphone 620 and may generate a signal (or voice data) corresponding to the detected user utterance. The external electronic device 601 may transmit the voice data to the electronic device 200 by using the communication interface 610.

The electronic device 200 may generate a plan for performing a task corresponding to the voice input or the result of performing an action depending on the plan, as a response to the voice input received from the external electronic device 601. For example, the plan may include a plurality of actions for performing a task corresponding to the voice input of the user and a plurality of concepts associated with the plurality of actions. The concept may define a parameter to be input upon executing the plurality of actions or a result value output by the execution of the plurality of actions. The plan may include relationship information between the plurality of actions and the plurality of concepts.

The external electronic device 601 may receive the response by using the communication interface 610. The external electronic device 601 may output the voice signal generated in the external electronic device 601 to the outside by using the speaker 630 or may output an image generated in the external electronic device 601 to the outside by using the display 640.

The processor 290 may receive information of a target (e.g., a user) from the external electronic device 601. The processor 290 may identify the first ASR module 221_1 among the plurality of ASR modules 221_0, 221_1, 221_2, . . . , 221_n based on the received information about a target.

The processor 290 may receive first voice data from the external electronic device 601. For example, the first voice data may be an utterance of the target. The processor 290 may generate first text data by converting the first voice data by using the identified first ASR module 221_1.

The processor 290 may identify a first language level of the target by using the first text data. The processor 290 may compare the first language level and a reference level. For example, the processor 290 may identify an age group of the target from information of the target. The processor 290 may compare the identified first language level with a reference level regarding a language in the age group of the identified target.

For example, the first language level may be determined based on at least one of the target's speaking time, the number of times that the target speaks, a listening level, the number of used words, and a pronunciation level.

The first language level may be based on a normal language development stage for each age group in Table 1. However, Table 1 is an example, and the normal language development stage may be changed, and the age group may be subdivided.

TABLE 1

| Age | Normal language development stage |
|---|---|
| 10 months | Speaking one or two words and imitating adult accents |
| 15 months | Using 3~5 words appropriately and speaking body portions |

TABLE 1-continued

| Age | Normal language development stage |
|---|---|
| 2 years | Making a short sentence of 3~4 words and using pronouns. Not using meaningless words. Looking at a picture and answering 3~5 names |

For example, the processor 290 may identify that the target is 2 years old, based on information about the age of the target among the information of the target. The processor 290 may identify that the target is capable of using 3-5 words appropriately and speaking body portions, based on the first text data. For example, according to Table 1, the processor 290 may identify that the first language level corresponds to an age of 15 months. The processor 290 may identify the reference level based on a fact that the target is 2 years old. The processor 290 may identify that the first language level is lower than the reference level.

The first language level may be based on evaluation items used in a language development test, an articulation ability test, and/or a fluency test. For example, the language development test may include a language development test for infants aged 4 months to 35 months, and an acceptance and expression vocabulary test for children aged 2 years to adults. For example, the articulation ability test may include a Korean articulation phonological evaluation for children aged 2 to 12 years. The fluency test may include a paradise fluency test for all ages.

For example, the processor 290 may identify that the target is 2 years old, based on information about the age of the target among the information of the target. On the basis of the first text data, the processor 290 may identify that the target's first language level corresponds to an age of 15 months, by using data related to a noun, a verb, an adjective, and an adverb. For example, the processor 290 may obtain the data related to a noun, a verb, an adjective, and an adverb based on content of the acceptance and expression vocabulary test. On the basis of a fact that the target is 2 years old, the processor 290 may identify that the first language level is lower than the reference level, by comparing the reference level with the first language level.

Data (e.g., data associated with a normal language development stage, an evaluation item used in the language development test, an evaluation item used in the articulation ability test, and/or an evaluation item used in the fluency test) for identifying the language level and the reference level may be stored in the memory 291 or provided as a separate DB. In an embodiment in which data is provided as a separate DB, the DB may be included in the electronic device 200. In an embodiment in which data is provided as a separate DB, the DB may be provided outside the electronic device 200. In this case, the electronic device 200 may access the DB.

The processor 290 may receive second voice data and/or second image data from the external electronic device 601 based on a fact that the first language level is lower than the reference level.

The electronic device 200 and the external electronic device 601 may be registered in the same target account. For example, the processor 290 may obtain second voice data and/or second image data from at least one of the electronic device 200 and at least one external electronic device registered in an account of the same target.

The processor 290 may identify a second language level of the target based on the received second voice data and/or second image data.

The description of the first language level may be applied to the description of the second language level. However, the second language level may further include, for example, the analysis of the behavior of the target in a determination reference. For example, as in the identification of the first language level, the processor 290 may compare data (e.g., data associated with a normal language development stage, an evaluation item used in the language development test, an evaluation item used in the articulation ability test, and/or an evaluation item used in the fluency test) with second text data, which is obtained by converting the second voice data by an identified ASR module, to identify the second language level. Furthermore, to identify the second language level, the processor 290 may use the result of analyzing the behavior of the target based on the second image data. The identified ASR module may be an ASR module identified based on, for example, the information of the target. In an embodiment, the identified ASR module may be an ASR module identified based on the age of the identified target from the first language level.

The processor 290 may determine whether the second language level satisfies a condition. For example, the condition may be whether a language level of the target is maintained at the second language level or is lower than the second language level even after a reference time has expired. For example, the processor 290 may identify the second language level during the reference time.

The processor 290 may generate output data including at least one of a voice output or an image output, based on a fact that the second language level satisfies the condition. The voice output may be used to query the target with voice. For example, the image output may be used to show visual data to the target and to induce a response input to the visual data.

The processor 290 may identify a third language level of the target based on the input data received in response to output data. For example, the input data may include a voice input, a touch input, and/or an input by a physical button.

For example, the processor 290 may compare data (e.g., data associated with a normal language development stage, an evaluation item used in the language development test, an evaluation item used in the articulation ability test, and/or an evaluation item used in the fluency test) with third text data, which is obtained by converting voice data inside the input data by an identified ASR module, to identify the third language level. Furthermore, to identify the third language level, the processor 290 may use the result of analyzing the behavior of the target based on image data inside the input data. In an embodiment, the identified ASR module may be an ASR module identified based on, for example, the information of the target. In an embodiment, the identified ASR module may be an ASR module identified based on the age of the identified target from the second language level.

The processor 290 may generate result data obtained by comparing the second language level with the third language level. The processor 290 may transmit the result data to the external electronic device (e.g., the external electronic device 601) registered in the target's account. The external electronic device may output the result data through a display device or a sound output device.

The memory 291 may store commands, information, or data associated with operations of components included in the electronic device 200. For example, the memory 291 may store instructions, when executed, that cause the processor 290 to perform various operations described in this disclosure.

Figure 2B:
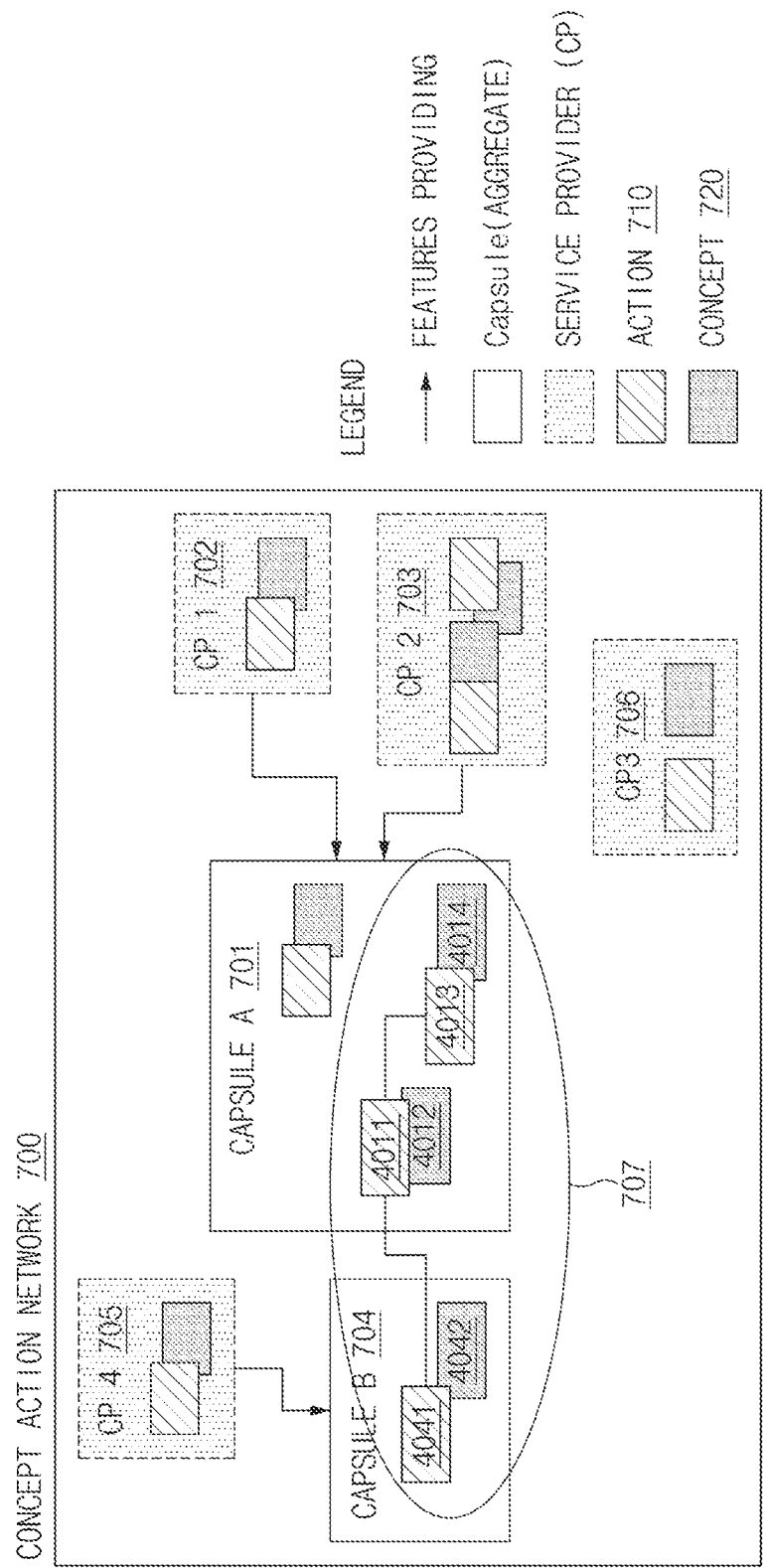
FIG. 2B illustrates a form in which relationship information between a concept and an action is stored in a database (DB), according to an embodiment.

FIG. 2B is a diagram illustrating a form in which relationship information between a concept and an action is stored in a DB, according to an embodiment.

The capsule DB 230 of the electronic device 200 may store a capsule in the form of a CAN 700. The capsule DB 230 may store an action for processing a task corresponding to a user's voice input and a parameter necessary for the action, in the CAN form.

The capsule DB may store a plurality capsules (a capsule A 701 and a capsule B 704) respectively corresponding to a plurality of domains (e.g., applications). One capsule (e.g., the capsule A 701) may correspond to one domain (e.g., a location (geo) or an application). The capsule DB may include a plurality of service providers (CP 1 702, CP 2 703, CP 3 706, and CP 4 705). Furthermore, at least one service provider (e.g., the CP 1 702 or the CP 2 703) for performing a function for a domain associated with the capsule may correspond to one capsule. The single capsule may include one or more actions 710 and one or more concepts 720 for performing a specified function.

The natural language platform 220 may generate a plan for performing a task corresponding to the received voice input, using the capsule stored in a capsule DB. For example, the planner module 225 of the natural language platform may generate the plan by using the capsule stored in the capsule DB. For example, a plan 707 may be generated by using actions 4011 and 4013 and concepts 4012 and 4014 of the capsule A 701 and an action 4041 and a concept 4042 of the capsule B 704.

Figure 2C:
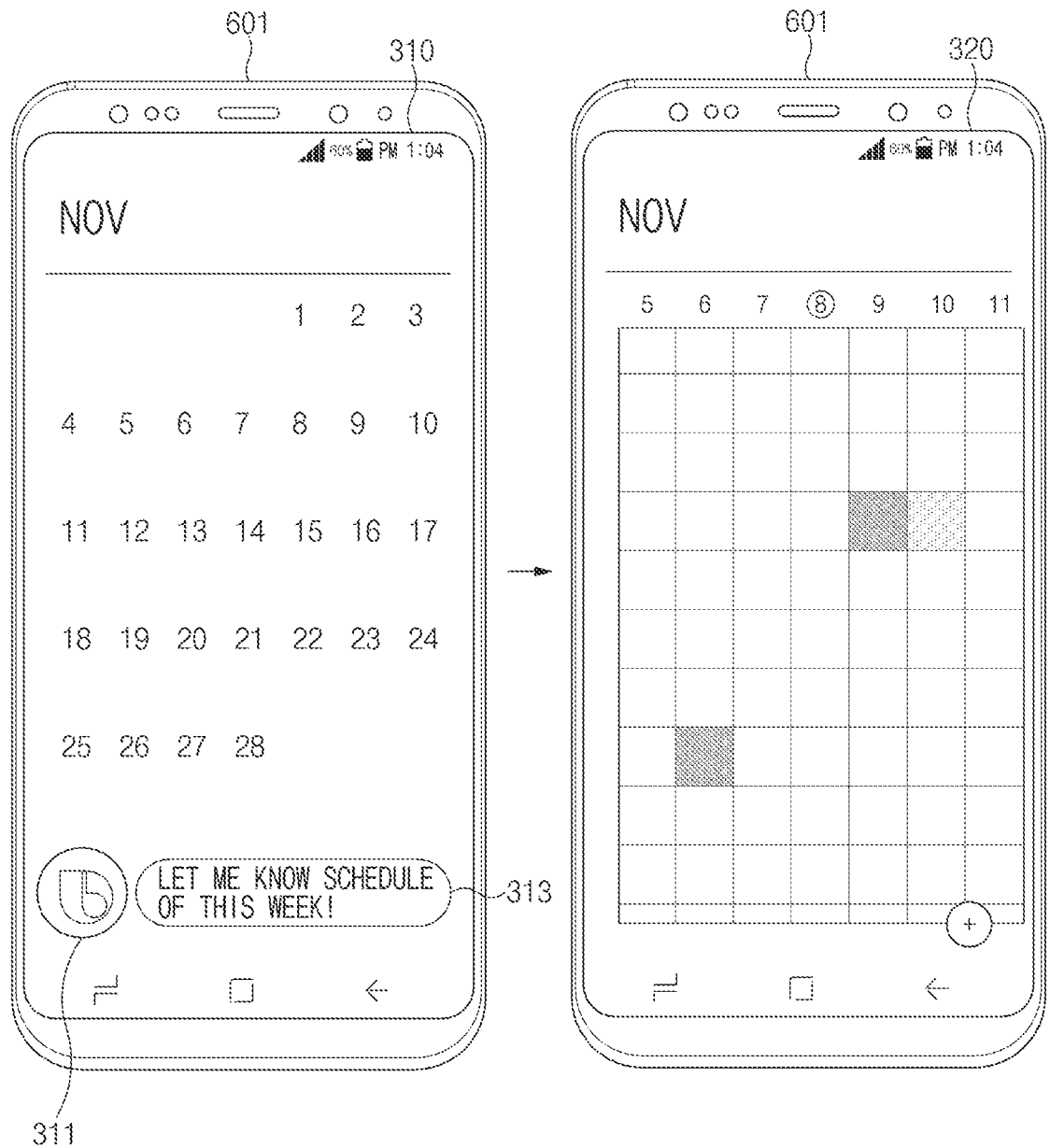
FIG. 2C illustrates a screen in which an external electronic device processes a voice input received through an intelligence app, according to an embodiment.

FIG. 2C is a diagram illustrating a screen in which the external electronic device processes a voice input received through an intelligence app, according to an embodiment.

The external electronic device 601 may launch an intelligence app to process a user input through the electronic device 200.

On screen 310, when recognizing a specified voice input (e.g., "wake up!") or receiving an input via a hardware key (e.g., a dedicated hardware key), the external electronic device 601 may launch the intelligence app for processing a voice input. For example, the external electronic device 601 may launch the intelligence app in a state where a schedule app is executed. The external electronic device 601 displays an object (e.g., an icon) 311 corresponding to the intelligence app, on the display 640. The external electronic device 601 may receive a voice input by a user utterance. For example, the external electronic device 601 may receive a voice input saying "let me know the schedule of this week!". The external electronic device 601 displays a user interface (UI) 313 (e.g., an input window) of the intelligence app, in which text data of the received voice input is displayed, on the display.

On a screen 320, the external electronic device 601 displays a result corresponding to the received voice input, on the display. For example, the external electronic device 601 may receive a plan corresponding to the received user input and may display the schedule of this week on the display depending on the plan.

An electronic device is provided that includes a processor and a memory operatively connected to the processor. The memory stores instructions that, when executed, cause the processor to identify a first ASR module, from among a plurality of ASR modules, based on information on a target received at the electronic device. The instructions also cause the processor to receive first voice data and first image data for the target, and convert the first voice data and the first image data to first text data using the first ASR module. The instructions further cause the processor to identify a first language level of the target based on the first text data, and output data including at least one of a voice output and an image output based on the first language level satisfying a condition.

The instructions may also cause the processor to receive second voice data of the target, convert the second voice data to second text data using the first ASR module, identify a second language level of the target based on the second text data, and compare the second language level to a reference level. The first voice data and the first image data for the target is received based on the second language level being lower than the reference level.

The first ASR module may be identified based on information associated with an age of the target from among the information on the target.

The instructions may also cause the processor to identify a second language level of the target based on input data received in response to the data, and output result data obtained by comparing the first language level with the second language level.

The instructions may also cause the processor to identify an account of the target in which the electronic device is registered, and identify at least one external electronic device registered in the account. The first voice data and the first image data may be received using the electronic device and the at least one external electronic device.

The first language level may be identified during a reference time interval. The instructions may also cause the processor to determine whether the condition is satisfied based on whether the first language level remains constant during the reference time interval.

In an embodiment, the instructions may also cause the processor to determine whether the condition is satisfied based on whether the first language level is reduced during the reference time interval.

The first language level may be identified by identifying at least one of the target's utterance time, the number of times that the target speaks, the number of words used by the target, the target's behavior analysis, and the target's pronunciation from the first image data and the first text data.

A method of an electronic device for identifying language level includes identifying a first ASR module, from among a plurality of ASR modules, based on information on a target received at the electronic device. First voice data and first image data for the target are received. The first voice data and the first image data are converted to first text data using the first ASR module. A first language level of the target is identified based on the first text data. Data including at least one of a voice output and an image output is output based on the first language level satisfying a condition.

The method may further include receiving second voice data of the target, converting the second voice data to second text data using the first ASR module, identifying a second language level of the target based on the second text data, and comparing the second language level with a reference level. The receiving of the first voice data and the first image data for the target may be performed based on the second language level being lower than a reference level.

The identifying of the first ASR module may be based on information associated with an age of the target among the information of the target.

The method may further include identifying a second language level of the target based on input data received in response to the data, and outputting result data obtained by comparing the first language level with the second language level.

The method may further include identifying an account of the target in which the electronic device is registered, and identifying at least one external electronic device registered in the account. The first voice data and the first image data for the target may be received using the electronic device and the at least one external electronic device.

The first language may be identified during a reference time interval. The method may further include determining whether the condition is satisfied based on whether the first language level is constant during the reference time interval.

In an embodiment, the method may further include determining whether the condition is satisfied based on whether the first language level is reduced during the reference time interval.

An electronic device registered in an account of a target may include a processor and a memory operatively connected to the processor. The memory may store instructions that, when executed, cause the processor to identify a first language level of the target based on first voice data of the target received at the electronic device. The instructions may also cause the processor to identify a second language level of the target by receiving second voice data and second image data from the electronic device and at least one external electronic device registered in the account, based on the first language level being lower than a reference level. The instructions may further cause the processor to output data including at least one of voice output and image output based on the second language level satisfying a condition, and to identify a third language level of the target based on input data received in response to the data.

The instructions may also cause the processor to output result data obtained by comparing the third language level with the second language level.

The instructions may also cause the processor to identify a first ASR module among a plurality of ASR modules based on information on the target. The first language level may be identified using the first ASR module.

The second language level may be identified during a reference time interval. The instructions may also cause the processor to determine whether the condition is satisfied based on whether the second language level is constant during the reference time interval.

The instructions may also cause the processor to determine whether the condition is satisfied based on whether the second language level is reduced during the reference time interval.

Hereinafter, the operation of an electronic device according to an embodiment is described with reference to FIGS. 3A, 3B, 4, 5, and 6. For clarity of description, details that are the same as those described in detail above are omitted.

Hereinafter, it is assumed that the electronic device 200 of FIG. 2A performs corresponding processes of FIGS. 3A, 3B, 4, and 5. An operation described as being performed by an electronic device may be implemented with instructions capable of being performed (or executed) by the processor 290 of the electronic device 200. The instructions may be stored in, for example, a computer-readable recording medium or the memory 291 of the electronic device 200 illustrated in FIG. 2A.

Hereinafter, it is assumed that the external electronic device 601 of FIG. 2A performs corresponding processes of FIGS. 3A and 3B. The operation described as being performed by an electronic device may be implemented with instructions capable of being performed (or executed) by the processor 660 of the external electronic device 601. The instructions may be stored in, for example, a computer-readable recording medium or the memory 650 of the external electronic device 601 illustrated in FIG. 2A.

Figure 3A:
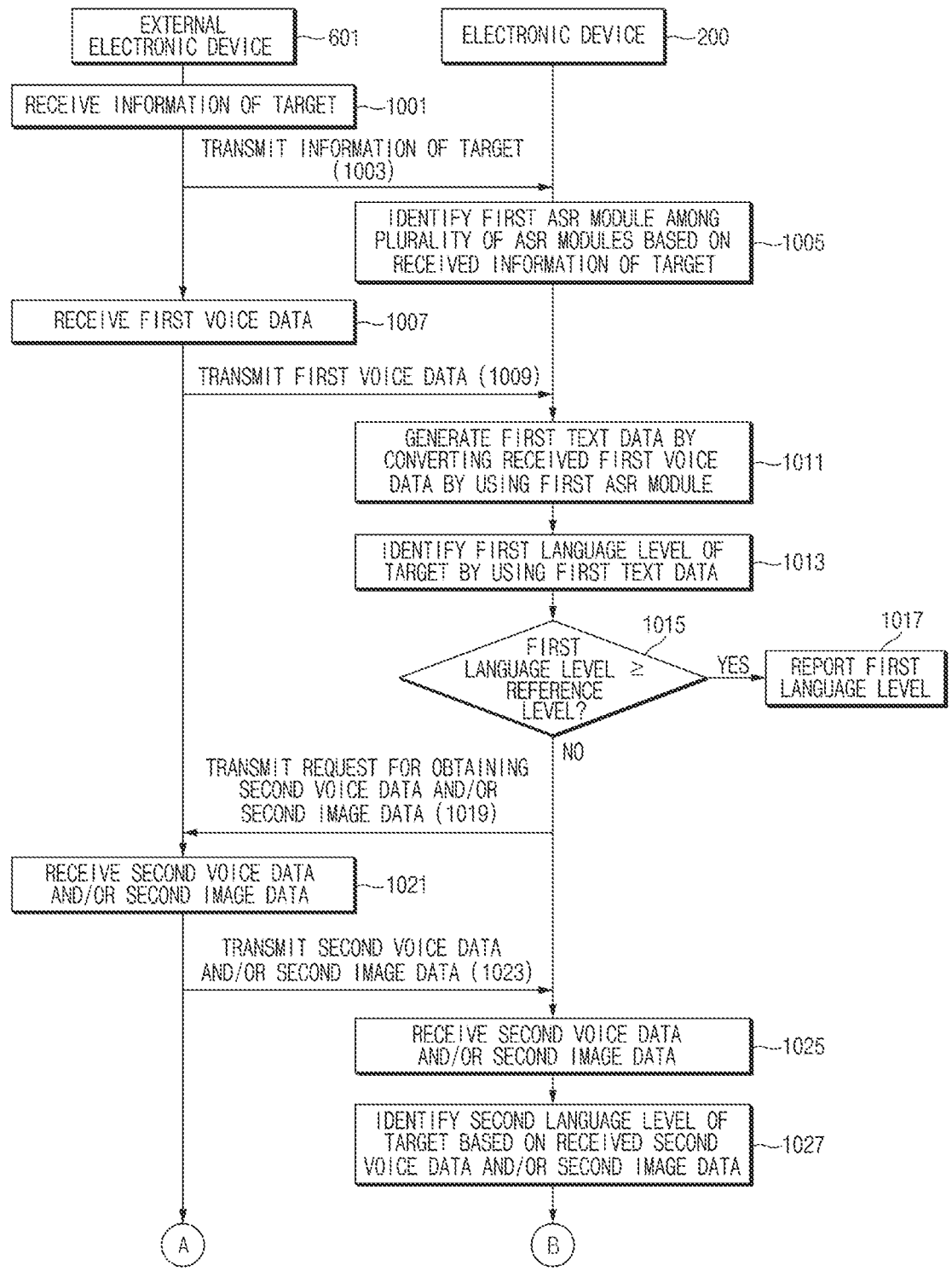
FIG. 3A is a diagram illustrating an operation of the electronic device, according to an embodiment.
Figure 3B:
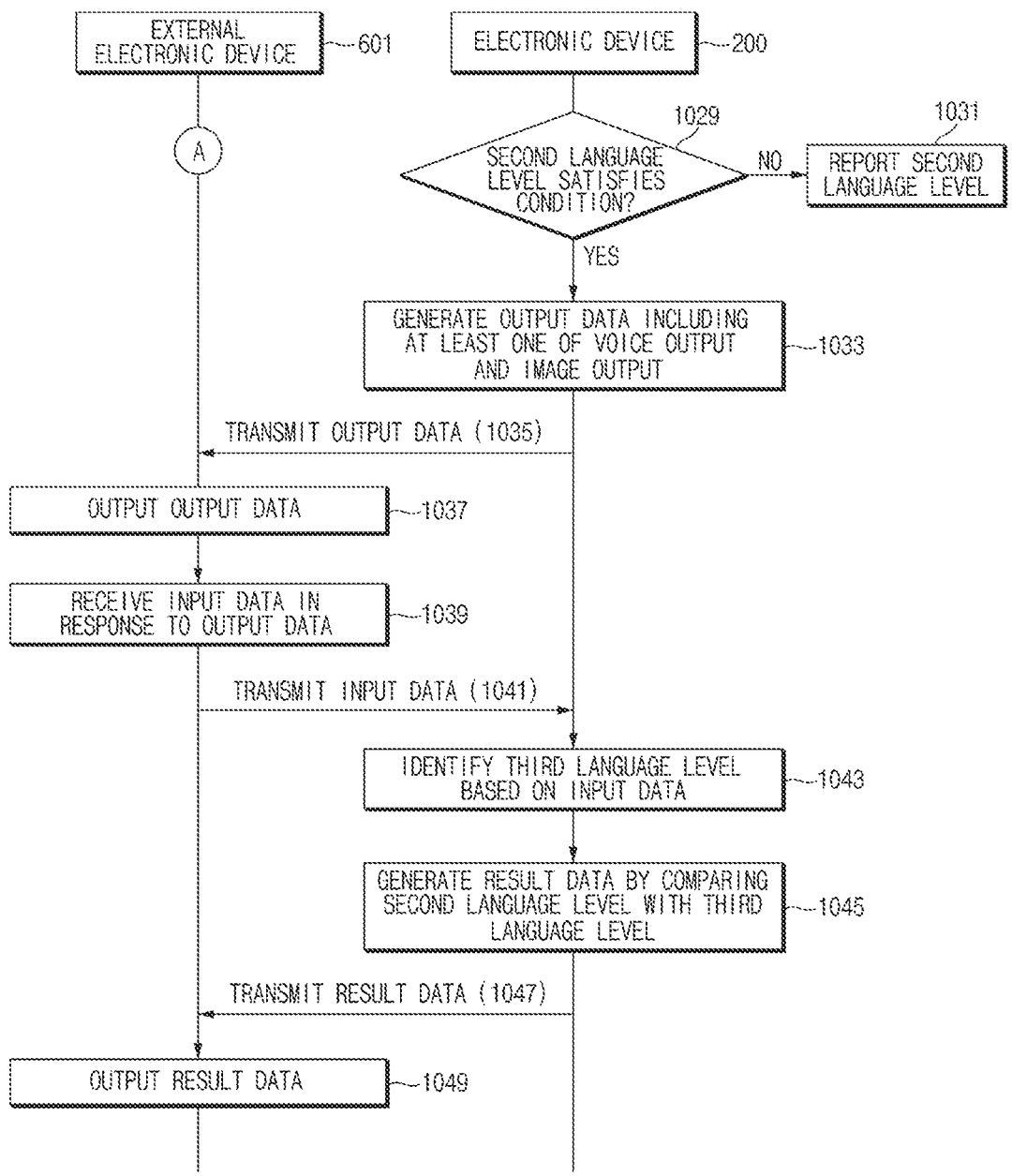
FIG. 3B is a diagram illustrating an operation of the electronic device, according to an embodiment.

FIGS. 3A and 3B are diagrams illustrating an operation of the electronic device, according to an embodiment.

Referring to FIG. 3A, at 1001, the external electronic device 601 receives information of a target (e.g., a user). For example, the information of the target may include at least one of the target's age, the target's face image, and the target's voice.

At 1003, the external electronic device 601 transmits the information of the target to the electronic device 200.

At 1005, the electronic device 200 identifies a first ASR module among a plurality of ASR modules based on the received information of the target.

The electronic device 200 may identify the first ASR module corresponding to an age from among the information of the target, based on information about the age of the target.

At 1007, the external electronic device 601 receives first voice data from the target.

At 1009, the external electronic device 601 transmits the first voice data to the electronic device 200.

At 1011, the electronic device 200 generates first text data by converting the received first voice data by using the identified first ASR module.

The electronic device 200 may identify the first text data that is a result, which is obtained from the first ASR module, from among results obtained by inputting the first voice data to all of the plurality of ASR modules.

At 1013, the electronic device 200 identifies a first language level of the target by using the first text data.

The electronic device 200 may identify the first language level of the target by comparing data (e.g., data associated with a normal language development stage, an evaluation item used in a language development test, an evaluation item used in an articulation ability test, and/or an evaluation item used in a fluency test) with the first text data.

At 1015, the electronic device 200 compares the first language level with a reference level. For example, the electronic device 200 may identify the reference level based on age-related information from among the information of the target.

When the first language level is the same as or higher than the reference level, at 1017, the electronic device 200 reports the first language level to a user. For example, when it is identified that the first language level corresponds to children being 3 years old, and the reference level based on the information of the target corresponds to children being 2 years old, the electronic device 200 may generate content associated with the target's language level and then may transmit the content to at least one of the external electronic device 601 or an external electronic device registered in the target's account. At least one of the external electronic device 601 or an external electronic device registered in the target's account may output the content through voice and/or an interface.

When the first language level is lower than the reference level, at 1019, the electronic device 200 transmits a request for obtaining second voice data and/or second image data to the external electronic device 601 registered in the target's account.

For example, when it is identified that the first language level corresponds to children being 3 years old, and the reference level based on the information of the target corresponds to children being 5 years old, the electronic device 200 may transmit a request for obtaining the second voice data and/or second image data to the external electronic device 601 registered in the target's account.

At 1021, the external electronic device 601 receives the second voice data and/or second image data in response to the request. For example, the second voice data may be an additional utterance input of the target. The second image data may also be data that is input from a sensor and/or camera of the external electronic device 601, and is used to identify the target's behavior of and/or the target's face.

The external electronic device 601 may output voice and/or image to the target to receive the second voice data and/or second image data in response to the request. For example, the external electronic device 601 may output a voice for querying the target through a speaker. For example, the external electronic device 601 may output an interface for inducing an input of the target and/or an input through a physical button, through a display.

At 1023, the external electronic device 601 transmits second voice data and/or second image data to the electronic device 200.

At 1025, the electronic device 200 receives the second voice data and/or second image data.

Figure 4:
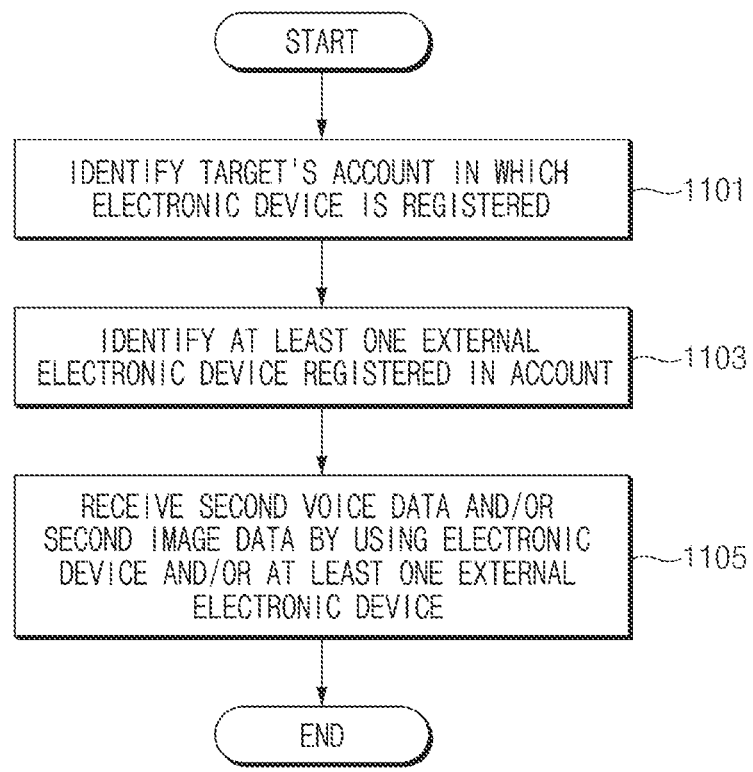
FIG. 4 is a flowchart illustrating detailed operations of FIG. 3A, according to an embodiment.

FIG. 4 is a flowchart illustrating operations of the electronic device, according to an embodiment. Specifically, FIG. 4 is a detailed description of operations 1019 and 1025 of FIG. 3A.

Specifically, the transmission of a request for obtaining second voice data and/or second image data, at 1019, and the reception of the second voice data and/or second image data, at 1025, may include the operations of FIG. 4. At 1101, the electronic device 200 identifies a target's account in which the electronic device 200 is registered. At 1103, the electronic device 200 identifies at least one external electronic device registered in the account. At 1105, the electronic device 200 receives the second voice data and/or second image data by using the electronic device 200 and/or the identified at least one external electronic device. The electronic device 200 may further include a sensor and/or display. In this case, the electronic device 200 may obtain second voice data and/or second image data through a sensor and/or display of the electronic device 200.

Referring back to FIG. 3A, at 1027, the electronic device 200 identifies the second language level of the target based on the received second voice data and/or second image data.

Independent of identifying the first language level, the electronic device 200 identifies the language level of the target again. The electronic device 200 may receive second voice data and/or second image data in real time during a reference time and then may continuously identify the second language level during the reference time based on the received second voice data and/or second image data.

Referring now to FIG. 3B, at 1029, the electronic device 200 identifies whether the second language level satisfies a condition.

Figure 5:
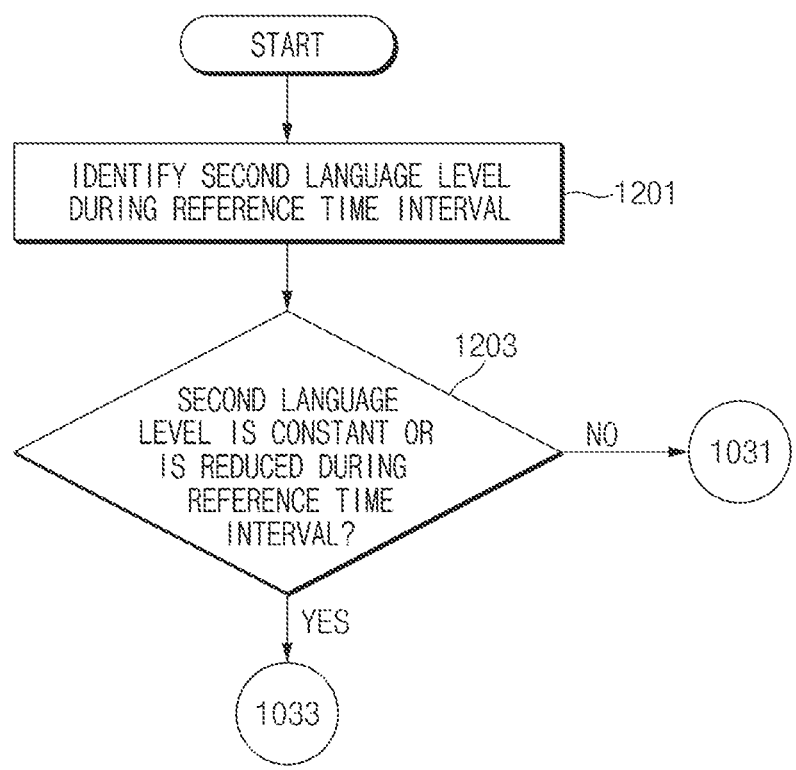
FIG. 5 is a flowchart illustrating detailed operations of FIG. 3B, according to an embodiment.

FIG. 5 is a flowchart illustrating operations of the electronic device, according to an embodiment. Specifically, FIG. 5 is a detailed description of 1029 of FIG. 3B.

The determination of whether the second language level satisfies a condition include operations 1201 and 1203 of FIG. 5. At 1201, the electronic device 200 identifies the second language level during a reference time interval. The electronic device 200 may continuously identify the second language level of a target during the reference time interval. At 1203, the electronic device 200 identifies a change in the second language level during the reference time interval. For example, when the second language level is constant during the reference time interval, the electronic device 200 may identify that the condition is satisfied. When the second language level is reduced during the reference time interval, the electronic device 200 may identify that the condition is satisfied. When the second language level increases during the reference time interval, the electronic device 200 may identify that the condition is not satisfied.

Referring back to FIG. 3B, when the second language level identified at the end of the reference time interval is higher than the second language level identified at the start of the reference time interval, at 1031, the electronic device 200 identifies that the condition is not satisfied and reports the second language level. For example, the electronic device 200 may generate content associated with the target's second language level and then may transmit the content to at least one of the external electronic device 601 or an external electronic device registered in the target's account. At least one of the external electronic device 601 or an external electronic device registered in the target's account may output the content through voice and/or an interface.

When the second language level identified at the end of the reference time interval is constant or is more reduced than the second language level identified at the start of the reference time interval, at 1033, the electronic device 200 identifies that the condition is satisfied and generates output data. For example, the output data may include at least one of a voice output and an image output.

At 1035, the electronic device 200 transmits the output data to the external electronic device 601 registered in the target's account.

At 1037, the external electronic device 601 outputs the output data through a speaker and/or a display.

At 1039, the external electronic device 601 receives input data in response to the output data. For example, the external electronic device 601 may receive an additional voice input, touch input, and/or input by a physical button from the target.

At 1041, the external electronic device 601 transmits received input data to the electronic device 200.

At 1043, the electronic device 200 identifies a third language level based on the input data.

Independent of identifying the first language level and the second language level, the electronic device 200 identifies the language level of the target based on the input data. The electronic device 200 may identify the target's hearing ability, vision, voice, and/or activity based on the input data. The electronic device 200 may identify a third language level based on the identified target's hearing ability, vision, voice, and/or activity.

At 1045, the electronic device 200 generates result data by comparing the second language level with the third language level.

Figure 6:
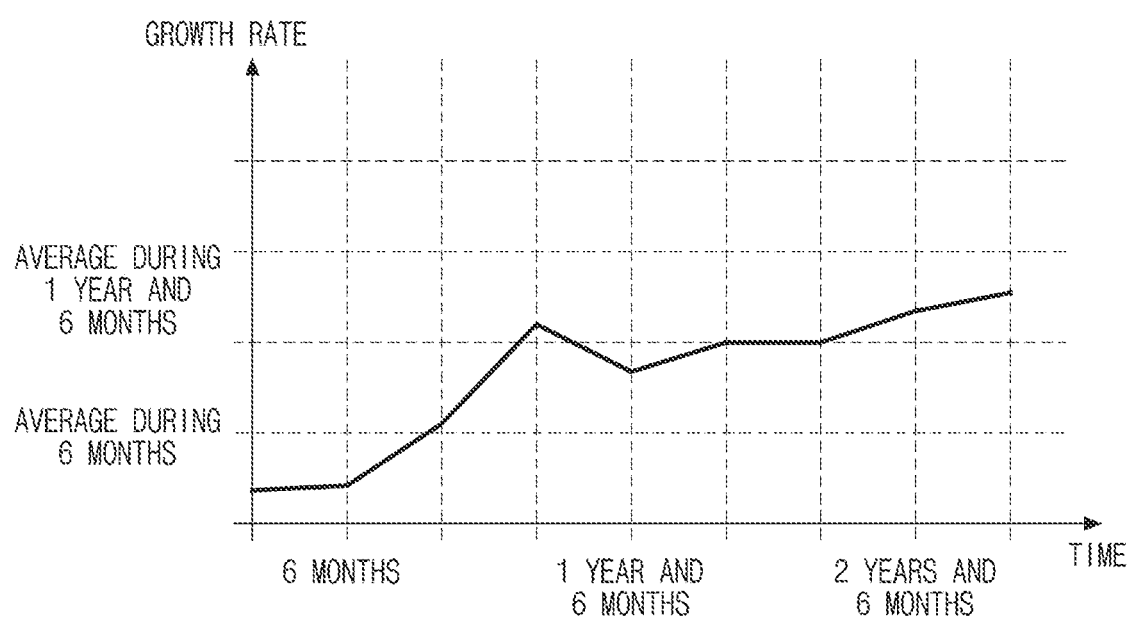
FIG. 6 is a diagram illustrating detailed operations of FIG. 3B; according to an embodiment.

For example, as shown in FIG. 6, the electronic device 200 may generate result data obtained by comparing the second language level with the third language level. FIG. 6 is a diagram shows result data with respect to 1045 of FIG. 3B, according to an embodiment. For example, when the second language level satisfies a condition, the result data may indicate how the result of again determining a language level has changed as compared to the second language level based on the input data that is a result of inducing the target to reply through voice and/or an image.

Referring back to FIG. 3B, at 1047, the electronic device 200 transmits the result data to the external electronic device 601.

At 1049, the external electronic device 601 outputs the result data through, for example, a display.

Hereinafter, operation of an electronic device is described with reference to FIG. 7. For clarity of description, details that are the same as those described in detail above are omitted.

Figure 7:
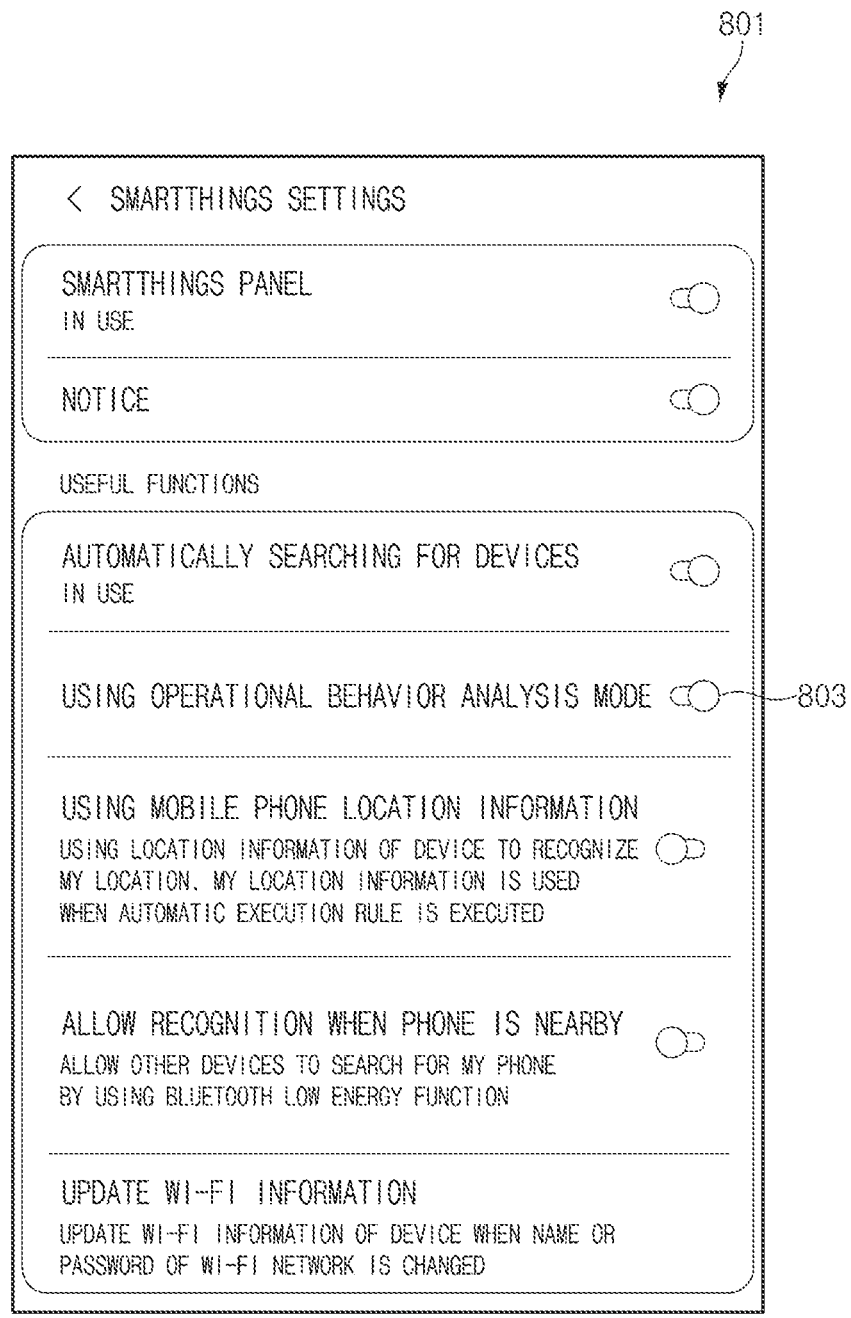
FIG. 7 is a diagram illustrating a user interface displayed by an external electronic device through a display, according to an embodiment.

FIG. 7 is a diagram illustrating a user interface displayed through a display of an external electronic device, according to an embodiment.

Referring to FIG. 7, an external electronic device displays a user interface 801 through a display.

The user interface 801 includes an object 803. When an input for activating the object 803 is received, the external electronic device may communicate with an electronic device such that the electronic device performs operations described with reference to FIGS. 3A, 3B, 4 and 5.

It should be understood that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, the module may be implemented in a form of an application-specific integrated circuit (ASIC).

Various embodiments set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a processor; and
a memory, wherein the memory stores instructions that, when executed, cause the processor to:
identify a first automatic speech recognition module, from among a plurality of automatic speech recognition modules, based on information on a target received at the electronic device;
identify a first language level of the target based on first voice data and first image data by at least:
receive the first voice data and the first image data from the target;
convert the first voice data and the first image data to first text data using the first automatic speech recognition module; and
identify the first language level of the target based on the first text data; and
in response to the first language level satisfying a condition, output data including at least one of a voice output and an image output.

2. The electronic device of claim 1, wherein the instructions further cause the processor to:
receive second voice data from the target;
convert the second voice data to second text data using the first automatic speech recognition module;
identify a second language level of the target based on the second text data; and
compare the second language level to a reference level, wherein the first voice data and the first image data from the target is received in response to the second language level being lower than the reference level.

3. The electronic device of claim 1, wherein the first automatic speech recognition module is identified based on information associated with an age of the target from among the information on the target.

4. The electronic device of claim 1, wherein the instructions further cause the processor to:
identify a second language level of the target based on input data received from the target in response to the data; and
output result data obtained by comparing the first language level with the second language level.

5. The electronic device of claim 1, wherein:
the instructions further cause the processor to:
identify an account of the target in which the electronic device is registered; and
identify at least one external electronic device registered in the account; and
the first voice data and the first image data are received using the electronic device and the at least one external electronic device.

6. The electronic device of claim 1, wherein:
the first language level is identified during a reference time interval; and
the instructions further cause the processor to determine whether the condition is satisfied based on whether the first language level remains constant during the reference time interval.

7. The electronic device of claim 1, wherein:
the first language level is identified during a reference time interval; and
the instructions further cause the processor to determine whether the condition is satisfied based on whether the first language level is reduced during the reference time interval.

8. The electronic device of claim 1, wherein the first language level is identified by identifying at least one of the target's utterance time, the number of times that the target speaks, the number of words used by the target, the target's behavior analysis, and the target's pronunciation from the first image data and the first text data.

9. A method of an electronic device for identifying language level, the method comprising:
identifying a first automatic speech recognition module, from among a plurality of automatic speech recognition modules, based on information on a target received at the electronic device;
identify a first language level of the target based on first voice data and first image data by at least:
receiving the first voice data and the first image data from the target;
converting the first voice data and the first image data to first text data using the first automatic speech recognition module; and
identifying the first language level of the target based on the first text data; and
in response to the first language level satisfying a condition, outputting data including at least one of a voice output and an image output.

10. The method of claim 9, further comprising:
receiving second voice data from the target;
converting the second voice data to second text data using the first automatic speech recognition module;
identifying a second language level of the target based on the second text data; and
comparing the second language level with a reference level, wherein the receiving of the first voice data and the first image data from the target is performed in response to the second language level being lower than the reference level.

11. The method of claim 9, wherein identifying the first automatic speech recognition module is based on information associated with an age of the target among the information of the target.

12. The method of claim 9, further comprising:
identifying a second language level of the target based on input data received from the target in response to the data; and
outputting result data obtained by comparing the first language level with the second language level.

13. The method of claim 9, further comprising:
identifying an account of the target in which the electronic device is registered; and
identifying at least one external electronic device registered in the account, and
wherein the first voice data and the first image data for the target is received using the electronic device and the at least one external electronic device.

14. The method of claim 9, wherein the first language level is identified during a reference time interval, and further comprising:
determining whether the condition is satisfied based on whether the first language level remains constant during the reference time interval.

15. The method of claim 9, wherein the first language level is identified during a reference time interval, and further comprising:
determining whether the condition is satisfied based on whether the first language level is reduced during the reference time interval.

16. An electronic device registered in an account of a target, the electronic device comprising:
a processor; and
a memory,
wherein the memory stores instructions that, when executed, cause the processor to:
identify a first language level of the target based on first voice data of the target received at the electronic device;
in response to the first language level being lower that a reference level, identify a second language level of the target based on second voice data and second image data from the electronic device and at least one external electronic device registered in the account;
in response to the second language level satisfying a condition, output data including at least one of voice output and image output; and
identify a third language level of the target based on input data received from the target in response to the data.

17. The electronic device of claim 16, wherein the instructions further cause the processor to:
output result data obtained by comparing the third language level with the second language level.

18. The electronic device of claim 16, wherein:
the instructions further cause the processor to identify a first automatic speech recognition module, from among a plurality of automatic speech recognition modules, based on information on the target; and
the first language level is identified using the first automatic speech recognition module.

19. The electronic device of claim 16, wherein:
the second language level is identified during a reference time interval; and
the instructions further cause the processor to determine whether the condition is satisfied based on whether the second language level is constant during the reference time interval.

20. The electronic device of claim 16, wherein:
the second language level is identified during a reference time interval; and
the instructions further cause the processor to determine whether the condition is satisfied based on whether the second language level is reduced during the reference time interval.

* * * * *